Jan. 22, 1957 J. KOMAS 2,778,710

TURRET TYPE MULTI-PEN RECORDING MECHANISM

Filed Feb. 17, 1955 3 Sheets-Sheet 1

INVENTOR
JOHN KOMAS
BY [signature]
[signature]
ATTORNEY

Jan. 22, 1957 J. KOMAS 2,778,710

TURRET TYPE MULTI-PEN RECORDING MECHANISM

Filed Feb. 17, 1955 3 Sheets-Sheet 2

INVENTOR
JOHN KOMAS
BY
ATTORNEY

Jan. 22, 1957 J. KOMAS 2,778,710

TURRET TYPE MULTI-PEN RECORDING MECHANISM

Filed Feb. 17, 1955 3 Sheets-Sheet 3

INVENTOR
JOHN KOMAS
BY Henry W. Coyle
Frederick E. Bartholy
ATTORNEY

United States Patent Office 2,778,710

Patented Jan. 22, 1957

2,778,710

TURRET TYPE MULTI-PEN RECORDING MECHANISM

John Komas, Binghamton, N. Y., assignor to General Aniline & Film Corporation, New York, N. Y., a corporation of Delaware Application February 17, 1955, Serial No. 488,741

4 Claims. (Cl. 346—139)

The present invention relates to electrical recording apparatus of the pen type and more particularly to a turret type multi-pen recording mechanism for use in such apparatus.

The recorder to which the present invention is applied is well known and generally comprises a strip chart mounted on a rotatable drum with a pen mounted on a carriage adapted to move axially along the drum whereby the pen may draw a continuous line on the chart as the drum rotates. The more conventional structure provides for the mounting of a single pen and when a different color is needed, replacement of the pen is necessary. Attempts have been made to mount a plurality of pens of different color on a carrier with means to select any particular pen at the will of the operator. Such a device is shown in the patent to Wendell Hess, Jr., No. 1,211,703, patented January 9, 1917. This patent discloses a turret type multi-pen recording mechanism in which the indexing of the various pens must be made manually by the operator which is cumbersome and requires that the recording apparatus be stopped for such change of recording pen.

The primary object of the present invention is to improve the turret support for the pens and provide novel means for accomplishing the pen indexing automatically during operation.

A feature of the present invention is that the pen indexing motion which comprises lifting, rotating and lowering of the multi-pen turret may be accomplished by a simple rotary motion of the conventional guide bar over which the turret assembly slides.

A further object of the invention is to provide a mechanism which is of relatively simple construction, inexpensive to manufacture, requires few parts and little space, and wherein the indexing is accurate and can be accomplished anywhere in the pen traverse.

Figure 1:
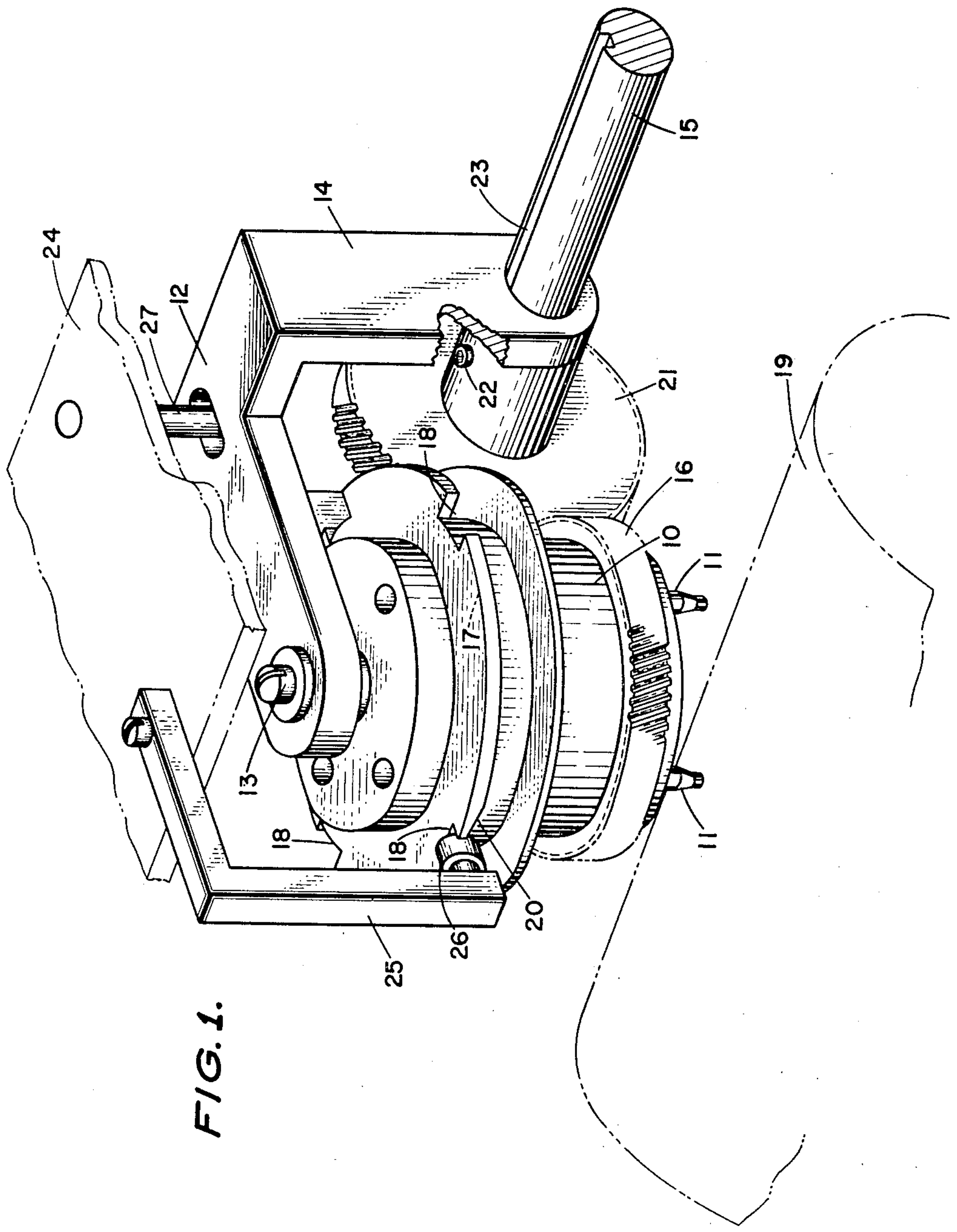

Other objects and features of the present invention will become apparent from the following description taken in connection with the accompanying drawings showing a preferred embodiment of the invention, wherein:

Fig. 1 is a perspective view of the turret mechanism forming the subject matter of the present invention, and Figs. 2, 3, 4 and 5 are enlarged front views showing the turret in various stages of operation in moving from one pen position to another.

Referring to the drawings in detail, and particularly to Fig. 1, the turret 10 comprises a cylindrical body, the lower face of which supports a plurality of spaced pens 11 each at equal radial distance. While any number of pens may be used, for the purpose of illustration, the present device discloses a construction using four pens each of which is of a different color. The turret 10 is mounted on a bracket 12 by means of a stud 13 permitting free rotation of the cylinder with respect to the bracket. The bracket 12 is provided with depending arms 14, the lower ends of which embrace the guide bar 15 whereby the bracket is slidable thereon and also angularly displaceable upon rotation thereof.

The turret 10 has rigidly mounted thereon a helical gear 16 and a flange 17. The flange 17 is provided with a plurality of slots 18 corresponding in number with the pens 11, said slots being normally positioned directly above each of the pens when said pens are in operative position above the drum 19. The underside of the flange 17, adjacent the slots 18, is provided with inclined surfaces 20.

The helical gear 16 meshes with the helical gear 21 which is axially slidable on the guide bar 15, but is restrained from turning independently of the guide bar by the spline element 22 cooperating with spline 23. The carriage, indicated by numeral 24, is of generally conventional structure and is mounted for movement parallel to the axis of the drum 19 at a fixed distance therefrom. The front of the carriage carries a fixed arm 25 at the lower end of which a roller 25 is supported. The roller is of sufficient diameter to fit snugly within the slots 18. At the rear of the carriage a driving pin 27 is provided for driving the carriage axially along the guide bar 15.

Figure 2:
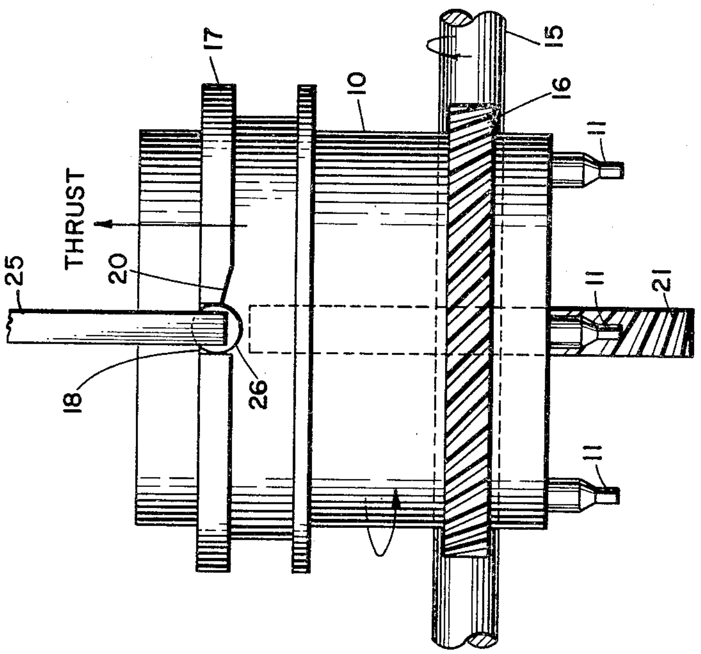
Figure 3:
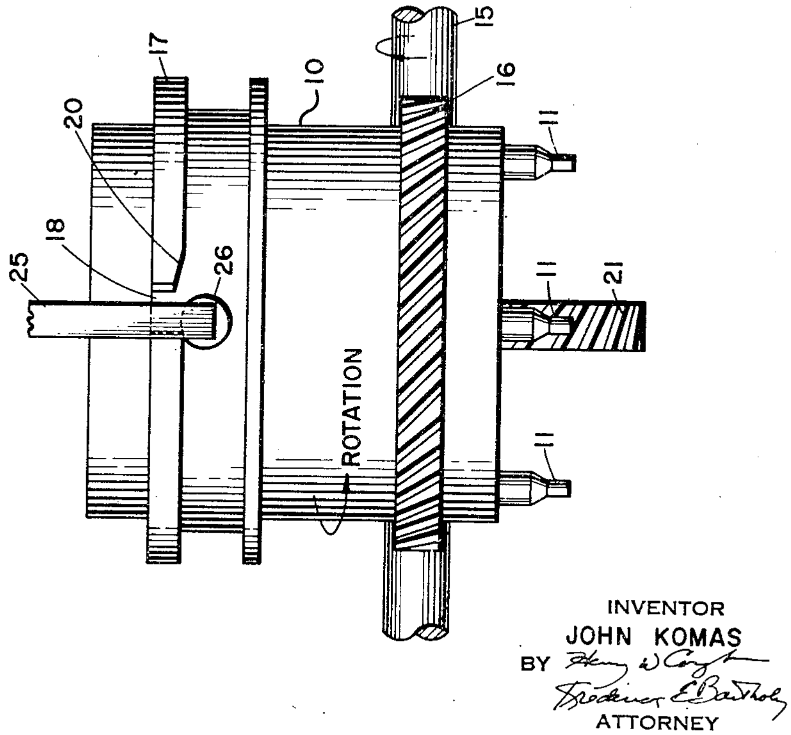
Figure 4:
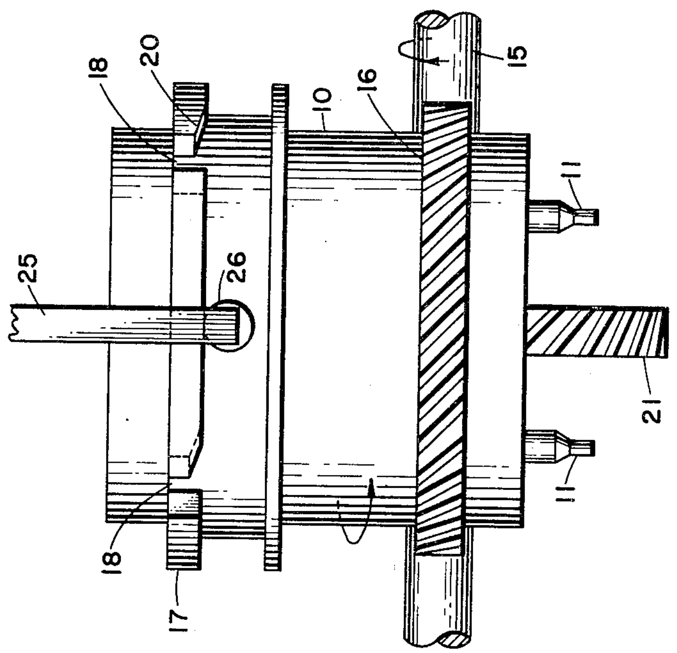
Figure 5:
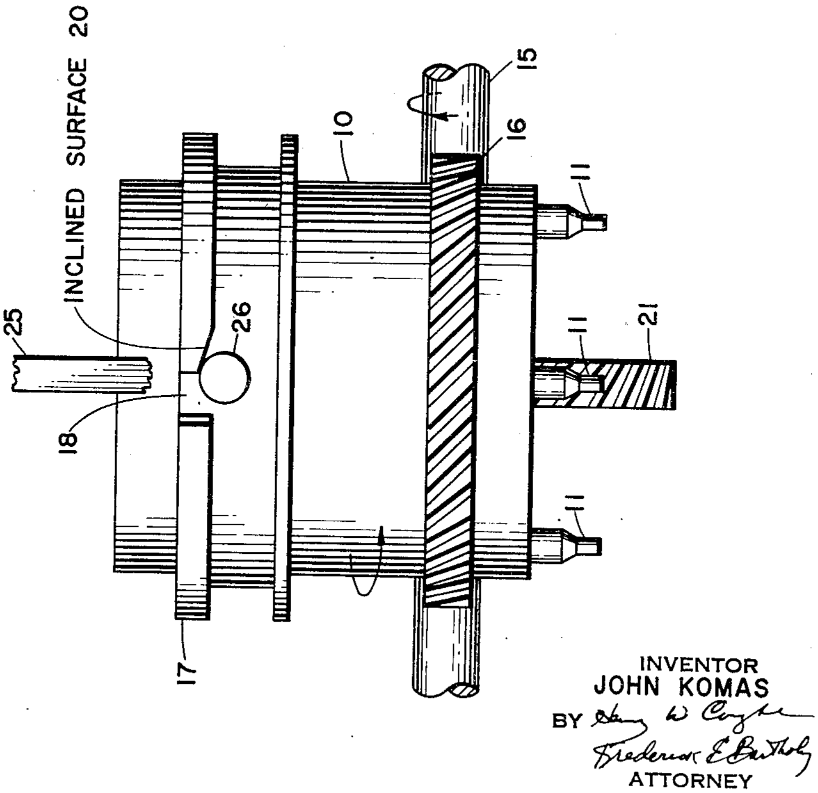

As seen in Fig. 1, the turret is in a normal operating position with one of the pens in contact with the drum 19. The turret 10 is locked against rotation by the roller 26 positioned in slot 18. To place another pen in operating position, the operating guide bar 15 is angularly displaced in a clockwise direction, thereby exerting force on the helical gear 21 which attempts to support a rotary motion to its mating helical gear 16. Since the turret is prevented from turning by rollers 26, an axial thrust is created tending to raise the turret. Fig. 2 of the drawings discloses the turret in locked position at the beginning of the thrust and Fig. 3 shows the turret in raised position free from the locking roller. Continued turning of the shaft causes rotation of the turret with the undersurface of the flange or cam 17 riding on the roller 26 as clearly shown in Fig. 4. Fig. 5 discloses the position of the locking roller as it approaches the next slot after the shaft has completed a 90° rotation. It will be noted that although the guide bar has rotated 90°, the turret has not yet turned 90° and this is due to the slight motion lost in raising the turret. However, due to the inclined surface 20 and the weight of the turret and its associated parts, the turret will move the remaining few degrees and drop into its next operating position. To advance the next pen into operative position, the above action is repeated by a further turning or rotation of the guide bar.

I claim:

1. In a recorder having a record sheet support and a carriage movable across said support, marking means movable with said carriage for tracing a record graph on a sheet placed on said support, said marking means comprising a cylindrical turret having a plurality of pens mounted at the underside thereof, means for supporting said turret for vertical and rotational movement, a cam flange on said turret having a plurality of slots coinciding with the number of pens and positioned above said pens, a locking roller carried by the carriage and adapted to enter one of the slots to prevent rotation of the turret, and means for raising the turret to disengage the locking roller from its slot and rotate the turret until the locking roller enters a second slot to prevent further rotation of the turret.

2. In a recorder having a record sheet support and a carriage movable across said support, marking means movable with said carriage for tracing a record graph on a sheet placed on said support, said marking means comprising a cylindrical turret having a plurality of pens mounted at the underside thereof, means for supporting said turret for vertical and rotational movement, a cam flange on said turret having a plurality of slots coinciding with the number of pens and positioned above said pens, a locking roller carried by the carriage and adapted to enter one of the slots to prevent rotation of the turret, a helical gear mounted on said turret, and a mating helical gear mounted on an operating guide bar whereby rotation of the operating guide bar will first raise and then rotate the turret.

3. In a recorder having a record sheet support and a carriage movable across said support, marking means movable with said carriage for tracing a record graph on a record sheet placed on said support, said marking means comprising a cylindrical turret having a plurality of pens mounted on the underside thereof, means for supporting said turret for vertical and rotational movement, a cam flange on said turret having a plurality of slots coinciding with the number of pens and positioned directly above said pens, a locking roller carried by said carriage and adapted to selectively enter one of the slots to prevent rotation of the turret, an operating guide bar, a helical gear mounted on said guide bar for sliding movement but keyed to the guide bar to rotate therewith, and a helical mating gear on said turret causing lifting and rotating of said turret upon rotation of said guide bar.

4. In a recorder having a record sheet support and a carriage movable across said support, marking means movable with said carriage for tracing a record graph on a sheet placed on said support, said marking means comprising a cylindrical turret having a plurality of pens mounted on the underside thereof, means for supporting said turret for vertical and rotational movement, a cam flange on said turret having a plurality of slots coinciding with the number of pens and positioned directly above said pens, a locking roller carried by said carriage and adapted to selectively enter one of the slots to prevent rotation of the turret, an operating guide bar, a helical gear mounted on said guide bar for sliding movement but keyed to the guide bar to rotate therewith, a helical mating gear on said turret causing lifting and rotating of said turret upon rotation of said guide bar, and an inclined surface on the underface of the cam flange adjacent each of the slots to permit further rotation of the turret.

References Cited in the file of this patent

UNITED STATES PATENTS

| | | |
|---|---|---|
| 2,125,345 | Hunt | Aug. 2, 1938 |
| 2,191,673 | Moore | Feb. 27, 1940 |